(No Model.)
M. L. WILCOX.
CHAIN ADJUSTMENT FOR BICYCLES.
No. 519,056. Patented May 1, 1894.
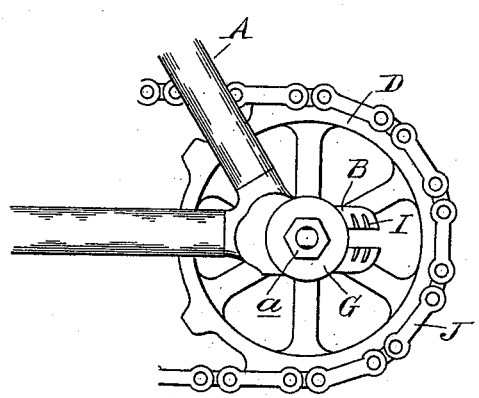
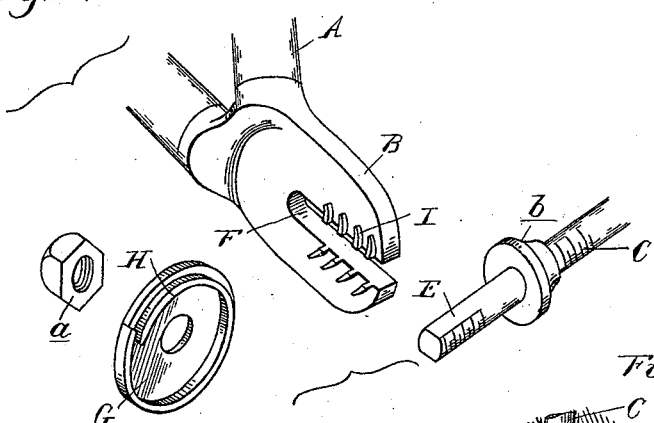
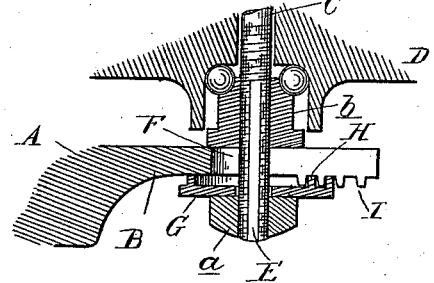
Witnesses
A. L. Hobby
O. F. Barthel
Inventor
Melvin L. Wilcox
By Luss Sprague weston
Attys.

UNITED STATES PATENT OFFICE.

MELVIN L. WILCOX, OF BAY CITY, MICHIGAN, ASSIGNOR TO THE NATIONAL CYCLE MANUFACTURING COMPANY, OF SAME PLACE.

CHAIN ADJUSTMENT FOR BICYCLES.

SPECIFICATION forming part of Letters Patent No. 519,056, dated May 1, 1894.

Application filed February 13, 1894. Serial No. 500,069. (No model.)

*To all whom it may concern:*

Be it known that I, MELVIN L. WILCOX, a citizen of the United States, residing at Bay City, in the county of Bay and State of Michigan, have invented certain new and useful Improvements in Chain Adjustments for Bicycles, of which the following is a specification, reference being had therein to the accompanying drawings.

The invention consists in the peculiar construction of a washer rotatorily secured on the shaft of the chain wheel, and provided with a scroll bearing adapted to engage stationary lugs or bearings on the frame beside the shaft whereby in the rotation of the washer the shaft will be adjusted laterally, all as more fully hereinafter described.

In the drawings, Figure 1 is an elevation of the rear shaft of a bicycle to which my invention is applied. Fig. 2 is a detached perspective view of the parts. Fig. 3 is a horizontal section centrally of the shaft.

I have shown my device as applied to the shaft of the rear wheel of the ordinary "safety" bicycle as now constructed in which ordinarily the sprocket wheel is made integral with the rear wheel hub or is secured thereto.

I do not desire to limit myself to the application of my invention however to the rear wheel of a bicycle as it may be applied in any desired place.

A shows the rear end of the frame of a bicycle provided with the rearwardly extending slotted plates B.

C is the rear axle upon which is secured the sprocket wheel D. The ends of this axle are preferably provided with a flat portion E which engages in the slots F formed horizontally in the plate B. The ends of the axle are screw threaded in the usual manner to receive the nuts $a\ b$ inside and outside of the plate. Between the nuts $a$ and the plate is the washer G which has formed on its inner face the scroll H the ends of which preferably overlap, as plainly shown in Fig. 2 and which is adapted to engage with the lugs I arranged on the outer face of the plates B with segmental grooves between them and preferably on opposite sides of the slots.

The parts being thus constructed and assembled, as shown in Fig. 3, if the nuts $a$ be loosened, it is evident that the washers G may be turned and that the scroll H engaging in the grooves between the lugs I will act as a screw or cam to move the washer and with it the axle C longitudinally, and thereby shift the sprocket wheel D correspondingly and tighten its chain J to the desired extent.

My construction not only simplifies the manufacture, but also reduces the number of pieces required, adds to its symmetrical appearance and assists in quick adjustment, for it is evident that if the nut $a$ be loosened sufficiently so that the scroll H be disengaged from between the grooves on the lugs I, it may be shifted longitudinally by hand without turning and re-engaged at the desired point and then the fine adjustment made by turning the washers. If desired the scrolls at opposite ends of the axle may be made right and left hand so that in adjusting the chain both washers may be turned in the same direction.

What I claim as my invention is—

1. In a bicycle, the combination of a shaft, a sprocket wheel thereon, a bearing in the frame in which said shaft is longitudinally, adjustably supported, a series of lugs on the frame beside the bearing, and a washer on the shaft having a scroll adapted to engage with said lugs, substantially as described.

2. In a bicycle, the combination of the shaft, a bearing in the frame in which said shaft is longitudinally, adjustably supported, clamping nuts to hold the shaft in its adjusted position, washers between the nuts and frame, a scroll on the inner face of washers, and lugs on the frame with which said scroll engages, substantially as described.

3. In a bicycle, the combination of the slotted plate B, the rear shaft engaging therein, the lugs I on each side of the slot, and washers G having a scroll H adapted to engage the lugs, substantially as described.

In testimony whereof I affix my signature in presence of two witnesses.

MELVIN L. WILCOX.

Witnesses:
JAMES WHITTEMORE,
MERRILL F. WILCOX.